United States Patent
Steffens et al.

(10) Patent No.: US 6,902,324 B2
(45) Date of Patent: Jun. 7, 2005

(54) CRANKSHAFT BEARING SHELL

(75) Inventors: Thomas Steffens, Bad-Rappenau (DE); Werner Schubert, Wiesloch (DE); Klaus Deicke, Untereisesheim (DE); Johann Krämer, Leonberg (DE); Jürgen Claus, Fellbach (DE)

(73) Assignee: KS Gleitlager GmbH, St. Leon-Rot (DE)

(*) Notice: Subject to any disclaimer, the term of this patent is extended or adjusted under 35 U.S.C. 154(b) by 141 days.

(21) Appl. No.: 10/398,758

(22) PCT Filed: Nov. 15, 2001

(86) PCT No.: PCT/EP01/13219

§ 371 (c)(1), (2), (4) Date: Apr. 10, 2003

(87) PCT Pub. No.: WO02/40882

PCT Pub. Date: May 23, 2002

(65) Prior Publication Data

US 2004/0101218 A1 May 27, 2004

(30) Foreign Application Priority Data

Nov. 15, 2000 (DE) .......................................... 100 56 579

(51) Int. Cl.[7] .............................................. F16C 33/12
(52) U.S. Cl. .................. 384/279; 384/294; 384/913
(58) Field of Search ................................ 384/276, 294, 384/912, 913; 428/653

(56) References Cited

U.S. PATENT DOCUMENTS

| | | | | |
|---|---|---|---|---|
| 4,973,523 A | * | 11/1990 | Neuhaus et al. | ............ 428/653 |
| 5,162,100 A | * | 11/1992 | Tanaka et al. | ............ 384/912 |
| 5,362,574 A | * | 11/1994 | Tanaka et al. | ............ 428/653 |
| 6,379,819 B1 | * | 4/2002 | Steffens et al. | ............ 428/653 |

FOREIGN PATENT DOCUMENTS

| | | |
|---|---|---|
| DE | 11 91 114 | 4/1965 |
| DE | 15 21 196 | 8/1969 |
| EP | 0 704 545 | 4/1996 |
| FR | 1 484 891 | 6/1967 |
| FR | 2 775 034 | 8/1999 |
| GB | 1 433 890 | 4/1976 |
| WO | WO 97 22 725 | 6/1997 |

* cited by examiner

*Primary Examiner*—Thomas R. Hannon
(74) *Attorney, Agent, or Firm*—Paul Vincent

(57) ABSTRACT

A crankshaft bearing shell in an internal combustion engine of a vehicle is made from a steel/aluminum composite material and is composed of a steel supporting layer and an aluminum plated sliding layer containing parts of tin and copper in the aluminum sliding layer, optionally comprising an intermediate layer consisting of pure aluminum. The aluminum sliding layer comprises AlSn (20–23) Cu(1.8–2.3) alloy, optionally containing additions of up to 0.1 wt % of Ni, 0.7 wt % of Si, 0.7 wt % Fe, 0.7 wt % Mn, 0.2 wt % Ti, wherein the sum of Si, Fe and Mn is less than 1 wt %; and impurities form a total amount of less than 0.5 wt.-% with the aluminum sliding layer having a Brinell hardness of at least 45 HB 1/5/30 after heat treatment.

11 Claims, 3 Drawing Sheets

|  | Rolling Direction | Transverse to Rolling Direction |
|---|---|---|
| Prior to Annealing | <br>Hardness: 53 HB 1/5/30<br>Breaking Elongation A5: 28 % | 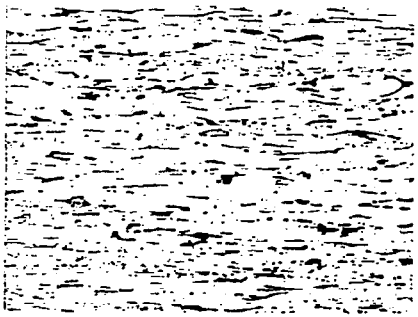 |
| After Annealing at 210°C / 2 h | <br>Hardness: 49 HB 1/5/30<br>Breaking Elongation A5: 34 % |  |
| After Annealing at 260°C / 2 h | <br>Hardness: 38 HB 1/5/30<br>Breaking Elongation A5: 38 % | 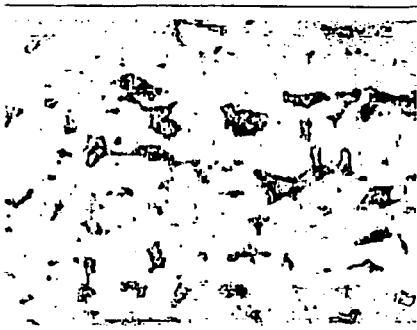 |

Hardness Test according DIN/ISO 4384 Part 1 ifung an Lagermetallen"
"Hardness Tests of Bearing Metals"

Tensile Tests according to DIN 50125

*Fig. 4*

CRANKSHAFT BEARING SHELL

BACKGROUND OF THE INVENTION

The invention concerns a crankshaft bearing shell for a combustion engine of an automotive vehicle and made from a steel/aluminum composite material having a steel support layer and a plated aluminum sliding layer with tin and copper portions in the aluminum sliding layer, optionally comprising an intermediate pure aluminum layer.

Due to the increasing power of engines, crankshaft-bearing shells for combustion engines of automotive vehicles must meet increasingly higher requirements concerning fatigue strength and achieve high hardness and strength values while maintaining excellent tribological properties.

Sliding layer shells of this type have been known for a long time having an aluminum sliding layer consisting of an aluminum alloy of material designation AlSn20Cu composed of 17.5 to 22.5% per weight tin 0.7 to 1.3% per weight copper and remainder aluminum with optional further alloy components of up to 0.7% silicon, 0.1% magnesium, 0.1% nickel, 0.2% titanium, 0.7% iron, 0.7% manganese and impurities of a total of less than 0.5% (all above amounts are % per weight). The fatigue strength of such crankshaft bearing shells during operation is however limited to a maximum load of 35 to 45 N/mm$^2$. This fatigue strength represents the load due to ignition and inertial forces acting on the projected bearing surface.

Crankshaft bearing shells comprising the above-mentioned aluminum sliding layer can be used without additional galvanic sliding layer (overlay-free) due to the high tin content, and have excellent tribological properties. The relatively high tin content produces thick, elongated, linear tin deposits during casting and rolling of the material at which cracks may form, and therefore only achieves the average fatigue strength region mentioned above.

EP 0 704 545 A1 discloses a steel/aluminum composite material having a tin content in the medium range of between 14 and 16% per weight and a copper content of 1.7 to 2.3% per weight in the aluminum sliding layer. The low tin content combined with thermal treatment in the region of 200 to 220° C. improved the fatigue strength and load capacity thereby facilitating use of this composite material in connecting rod bearings for the large connecting rod eye. The seizure resistance required for use as a crankshaft bearing shell was not obtained since the tin content was reduced relative to that of the AlSn20Cu alloy.

The high requirements for seizure resistance in crankshaft bearing shells result from unavoidable misalignment and shape deviations during production of the crankshaft despite the most demanding honing and finishing processes for the crankshaft and the bearing block and their effects under extreme loads and at high sliding velocities of more than 10 m/s which occur in modern combustion engines.

DT 1 521 196 discloses use of an aluminum alloy with 10 to 35, preferably 18 to 22% tin, 0.5 to 2% copper, and suggests thermal treatment at 230° to 425° C. of the bimetal strips produced through rolling of the aluminum alloy onto a steel backing. Very large tin deposits characterize a steel/aluminum composite material, which is treated at this temperature. It has a very low fatigue strength and low hardness and would not be suited for production of crankshaft bearing shells for modern combustion engines. Nor does the very broad range of copper content of between 0.5 and 2% help to further define the sliding bearing material.

DD 50319 describes a method for producing sliding bodies from aluminum alloys with up to 30% tin and 3% copper. The document mentions a steel mandrel for the production of the bore of bushings, and the undesired effect of gravitational segregation, which suggests a continuous casting method for monometallic parts. The fact that up to 30% of tin and up to 30% of copper are added, wherein the copper should generally increase hardness, does not provide clear definition of the aluminum sliding bearing layer. This document also mentions that a tin portion of up to 18% was suggested in prior art to thereby obtain competitive results with regard to bearing load.

Based on these findings, it is the underlying purpose of the present invention to produce a crankshaft bearing shell of the above-mentioned type which can withstand a load during operation of the engine of considerably more than 55 N/mm$^2$ at a high sliding speed of more than 10 m/s while nevertheless maintaining good sliding properties comparable to those of the above-mentioned crankshaft bearing shell having a sliding layer of AlSn20Cu.

SUMMARY OF THE INVENTION

This object is achieved with a crankshaft bearing shell of this type which is characterized in accordance with the invention in that the aluminum sliding layer is formed from an AlSn (20–23)Cu(1.8–2.3) alloy (1.8–2.3% per weight of copper and 20–23% per weight of tin), optionally with the addition of up to 0.1% per weight of Ni, 0.7% per weight of Si, 0.7% per weight of Fe, 0.7% per weight of Mn, 0.2% per weight of Ti, wherein Si, Fe and Mn total <1% per weight, and impurities of a total of less than 0.5% per weight, the aluminum sliding layer having a Brinell hardness of at least 45 HB 1/5/30 following thermal treatment. The Brinell hardness is determined according to DIN ISO 4384 part 1 of October 1982 in connection with ISO 6506 mentioned therein (corresponding to DIN 50 351).

In contrast to the conventional crankshaft bearing shell having an aluminum sliding layer of AlSn20Cu, it was surprisingly found that an increase in the copper content to the stated range of 1.8–2.3% per weight in connection with thermal treatment (described in more detail below) dissolves the linear tin deposits produced during rolling and leads to finely distributed tin deposits of a size generally less than 5 µm. In this fashion, a high tin content of between 20 and 23% per weight in the sliding layer and the associated excellent sliding properties of the known AlSn20Cu alloy can be maintained, while increasing the fatigue strength to a specific load of considerably more than 55 N/mm$^2$ for an AlSn20Cu2 alloy, to 59 N/mm$^2$. The high hardness, which also results from thermal treatment of at least 45 HB 1/5/30, preferably at least 47 HB 1/5/30, is due to the substantial maintenance of the advantageous stresses produced through roll plating in view of the thermal treatment at relatively low temperatures (to be described below).

The breaking elongation $A_5$ of the light metal layer is at least 32% as determined according to DIN 50 125 (April 1991), wherein a flat sample section of a width b and thickness a is stretched in a drawing test until the sample breaks. Breaking elongation is the amount of extension beyond an initial measurement length at which the flat sample section breaks. The breaking elongation in percent is then the quotient between the stretched extention and the initial measurement length. The breaking elongation $A_5$ is based on an initial measurement length L which is approximately L=5.65 $\sqrt{a \cdot b}$. For a flat sample of slightly larger overall length, several initial length section can be removed and one can be used for measurement or calculation of the breaking elongation within which the sample breaks.

The breaking elongation is at a minimum in the rolled state before thermal treatment, which means that the light metal bearing layer is very hard but therefore also very brittle. Thermal treatment reduces this brittle behavior as reflected by the increase in breaking elongation. The breaking elongation $A_5$ of the light metal layer following thermal treatment should be at least 32%, preferably 33% and particularly preferred not more than 36%. Breaking elongation of 36% and more are accompanied by a reduction in the fatigue strength and the loading capacity which can, in particular, be determined by measuring the fatigue strength under reserved bending stresses.

It must be emphasized that the breaking elongation $A_5$ is determined on the flat sample section of the light metal layer, i.e. not on a flat sample section from a steel/aluminum composite material, since the steel layer would otherwise dominate the behavior of the flat sample section during the breaking test. For this reason, a light metal layer of the aluminum sliding bearing alloy with exactly the same reduction per pass as that in the production of the steel/aluminum composite material is used and subjected to the same thermal treatment. The light metal layer is then tensile-tested to determine the breaking elongation $A_5$.

The invention also concerns a method for producing a crankshaft bearing shell of the inventive type, which is characterized by thermal treatment of the steel/aluminum composite material before bending of plate sections into a semi-circular shape. After casting, rolling and roll plating f the aluminum alloy to form the sliding layer on the steel carrier layer, thermal treatment is carried out at a temperature of 200 to 220, preferably 200 to 215° C. for 2 to 10 hours (see EP 0 704 545 A1). It as previously assumed that sliding bearing shells having specific loads of considerably more than 55 N/mm² could only be obtained with average zinc contents in the aluminum-sliding layer up to approximately 18% per weight. It was therefore surprising that, even with hi her zinc content in conjunction with the stated thermal treatment, the large linear zinc deposits could be finely distributed in the above-mentioned size range. The string-shaped or linear zinc deposits are largely transformed through thermal treatment into point-like deposit having an extension of mainly $\leq 5$ μm.

The above-mentioned thermal treatment, carried out at a temperature of 200° C., should take approximately 10 hours. For a thermal treatment temperature close to the upper limit of the interval at 220° C., a processing time of only approximately 2 hours is adequate to distribute the tin deposits. It is explicitly pointed out that the string-shaped tin deposits produced through rolling of the sliding layer are not dissolved at lower temperatures of e.g. 195° C. Moreover, thermal treatment at temperatures above 220° C. leads to re-coagulation of the tin into large deposits and the loading capacity and fatigue strength are thereby strongly reduced. Moreover, thermal treatment at temperatures above 220° C. also leads to an undesired reduction in the stresses produced within the material during rolling and roll plating which increase the hardness and rigidity of the sliding layer and which are therefore advantageous.

The stated thermal treatment reduces the hardness of the aluminum-sliding layer (measured in Brinell hardness according to DIN ISO 4384 part 1) by less than 15%; the hardness after thermal treatment is then at least 85% of the hardness of the plated aluminum sliding layer before thermal treatment. In the event of annealing above the stated temperature range, the stresses produced during roll plating are greatly reduced, thereby drastically reducing the hardness.

BRIEF DESCRIPTION OF THE DRAWINGS

Further details, advantages and features of the invention can be extracted from the accompanying claims, and figures and from the following description thereof.

FIG. 4 shows micrographic views of an inventive steel/AlSn20Cu2 composite material and FIG. 5 shows a top view onto a flat sample for determining the breaking elongation.

DESCRIPTION OF THE PREFERRED EMBODIMENT

Figure 1:
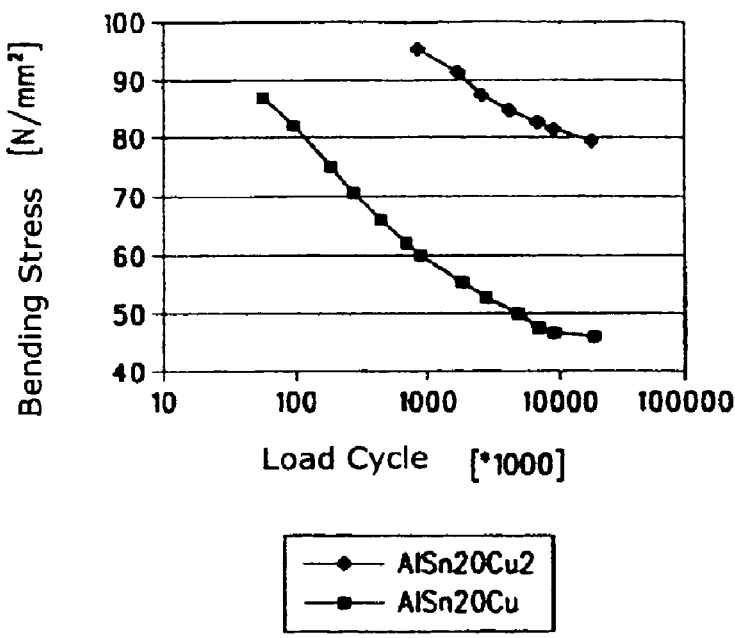
FIG. 1 shows a comparison between the fatigue strength under reversed bending stresses of a conventional and an inventive steel/aluminum composite material for a crankshaft bearing shell.
Figure 2:
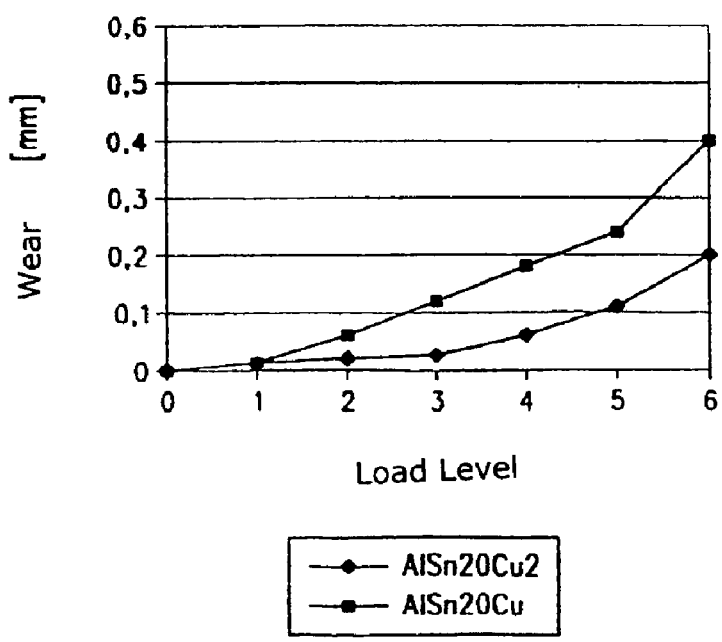
FIG. 2 shows a comparison between the emergency running properties of a conventional and an inventive steel/aluminum composite material for a crankshaft bearing shell.

FIGS. 1 and 2 show comparative measurements of the fatigue strength under reversed bending stresses and the emergency running properties of a steel/aluminum composite material, wherein the aluminum sliding layer is formed of an AlSn20Cu1 alloy and an AlSn20Cu2 alloy.

Figure 3:
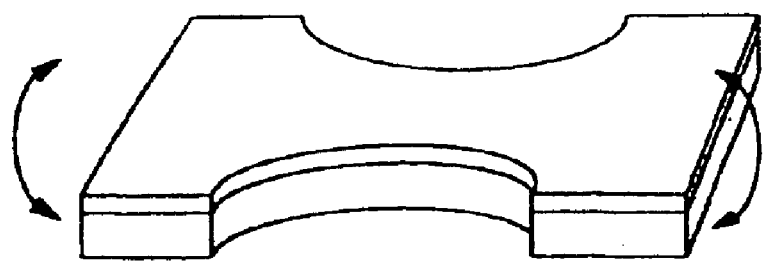
FIG. 3 shows plate-shaped test sections.

In the measurement of FIG. 1, plate-shaped sections of the shape indicated in FIG. 3 were formed from the respective steel/aluminum composite materials, clamped at their longitudinal ends in a test stand, and alternatingly bent back and forth such that, with maximum load, a bending stress results which was varied in the respective test series between approximately 47 and 95 N/mm². The respective load cycle was determined up to which the plate remained undamaged. FIG. 1 shows that, for the conventional steel/aluminum composite material made from an AlSn20Cu1 alloy, the bending stress must be reduced to below 50 N/mm² to obtain a running time of 10 million load alternations without damage. For the new steel/aluminum composite material from an AlSn20Cu2 alloy, a running time of 10 million load alternations was obtained in this test method even at slightly less than 80 N/mm².

FIG. 2 shows results of wear measurements for six different load levels and with deficient lubrication for determining the emergency running properties.

The emergency running properties were determined in a pin/disc test under the following test conditions:

| Test conditions | |
| --- | --- |
| Deficient lubrication | 7 mg/min |
| Sliding speed | 5/5/6/7/8/9 m/sec |
| Surface pressure | 5/6.5/8.0/9.5/11.0/12.5 N/mm² |

After a predetermined time of 15 minutes, the wear of the pin whose end face is formed by the aluminum sliding layer of the tested steel/aluminum composite material is measured at the respective load levels. FIG. 2 shows the results. For the inventive steel/aluminum composite material, the wear was reduced e.g. by 50%.

FIG. 4 shows micrographs of the aluminum-sliding layer of an inventive steel/aluminum composite material with an AlSn20Cu2 alloy in a plane perpendicular to the rolling direction (right) and in a plane, which includes the rolling direction (left) (before thermal treatment (upper) and after thermal treatment at 210° Celsius (center)). Corresponding micrographs of the same sliding layer after thermal treatment at 26° Celsius are also shown (lower). Thermal treatment largely dissolved the string-shaped or linear tin deposits formed by rolling the material as shown on the left hand side of FIG. 4. The hardness of the aluminum sliding layer was 53 HB 1/5/30 after plating and 49 HB 1/5/30 after subsequent thermal treatment. After thermal treatment above 220° C., the stress produced during roll plating was increasingly reduced such that, after thermal treatment at 260° C. for 2 hours, a reduction to 38 HB 1/5/39 resulted, which is not acceptable for main bearing shell applications. The resulting coarse tin deposits are also visible which represent potential locations where cracks may form and reduce the fatigue strength to unacceptable values for these applications.

Figure 5:
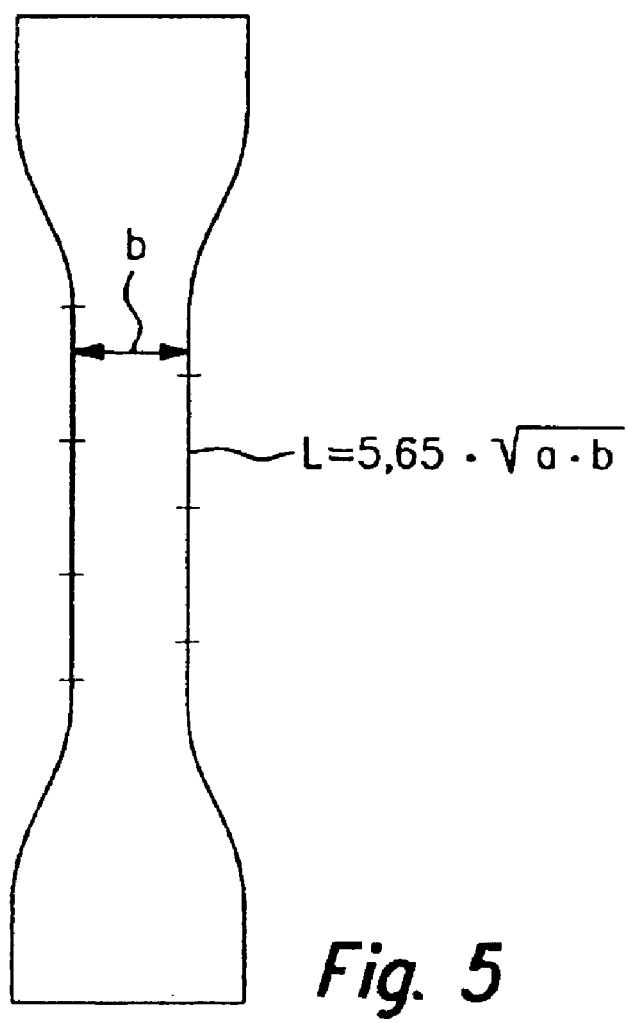

Breaking elongation values $A_5$ of the respective materials as described above are also given. Therein, an aluminum-sliding layer of AlSn20Cu2 was rolled with the same reduction per pass as with the composite material and then flat sample sections of the type shown in FIG. 5 were produced. The flat sample sections of the sliding layer alloy had a width of 20 mm and a thickness of 0.5 mm. This thickness corresponds to the layer thickness of the aluminum-sliding layer of a steel/aluminum composite material. On both sides of the flat sample section, longitudinal sections of an initial measurement length L of 5.65 $\sqrt{20 \cdot 0.5}$ mm were removed. The sample was then stretched to the breaking limit and the breaking elongation was given as the quotient between the extension and the initial length of measurement, in percent. A breaking elongation $A_5$ of 28% was measured in the rolled aluminum sliding layer alloy. After annealing at 210° C. for two hours, the material became less brittle and the measured breaking elongation $A_5$ was 34%. Following the thermal treatment at 260° C. for two hours as mentioned above, the breaking elongation $A_5$ was 38%. However, the associated fatigue strength or fatigue strength under reversed bending stresses is insufficient for crankshaft bearing shell applications.

In summary, the invention produced a steel/aluminum composite material, which is excellently, suited for the production of crankshaft bearing shells which better satisfies current requirements with regard to hardness, wear, fatigue strength and tribological properties than other conventional materials.

We claim:

1. A crankshaft bearing shell for a combustion engine of an automotive vehicle, the shell comprising:

a steel carrier layer; and a plated sliding layer supported on said steel carrier layer, said plated sliding layer comprising an AlSn(20–22)Cu (1.9–2.1) alloy having a Brinell hardness of at least 45 HB 1/5/30 following thermal treatment.

2. The bearing shell of claim 1, further comprising a substantially pure aluminium layer disposed between said steel carrier layer and said plated sliding layer.

3. The bearing shell of claim 1, further comprising additions of up to 0.1% per weight of Ni, 0.7% per weight of Si, 0.7% per weight of Fe, 0.7% per weight of Mn, and 0.2% per weight of Ti, wherein Si, Fe, and Mn are in total <1% per weight and with impurities of a total of less than 0.5% per weight.

4. The crankshaft bearing shell of claim 1, wherein said sliding layer has a Brinell hardness of at least 46 HB 1/5/30.

5. The crankshaft bearing shell of claim 4, wherein said sliding layer has a Brinell hardness of at least 47 HB 1/5/30.

6. The crankshaft bearing shell of claim 5, wherein said sliding layer has a Brinell hardness of at least 48 HB 1/5/30.

7. The crankshaft bearing shell of claim 1, wherein tin is mainly present in the form of finely distributed deposits with a size of <5 μm.

8. The crankshaft bearing shell of claim 1, wherein said sliding layer has a thickness of between 0.15 to 1 mm.

9. The crankshaft bearing shell of claim 8, wherein said sliding layer has a thickness of between 0.2 to 1 mm.

10. A method for producing the crankshaft bearing shell of claim 1, the method comprising the steps of:

a) roll plating said AlSn alloy for forming said sliding layer on said steel carrier layer;

b) subjecting said sliding layer plated onto said steel carrier layer to a thermal treatment at a temperature of between 200 and 220° C. for 2 to 10 hours; and c) bending said sliding layer plated onto said steel carrier layer into a shape of the crankshaft bearing shell following step b).

11. The crankshaft bearing shell of claim 1 produced from said steel carrier layer and said plated sliding layer and subjected to thermal treatment at a temperature of 200 to 220° C. for 2 to 10 hours.

* * * * *

UNITED STATES PATENT AND TRADEMARK OFFICE
CERTIFICATE OF CORRECTION

PATENT NO.         : 6,902,324 B2                                                   Page 1 of 1
APPLICATION NO. : 10/398758
DATED              : June 7, 2005
INVENTOR(S)        : Thomas Steffens et al.

It is certified that error appears in the above-identified patent and that said Letters Patent is hereby corrected as shown below:

Title Page; item (73);

Please add the following second Assignee

-- Daimler AG, Stuttgart (DE) --.

Signed and Sealed this

Third Day of August, 2010

David J. Kappos
*Director of the United States Patent and Trademark Office*